March 11, 1930.  C. M. JOHNSON  1,749,769
AIRPLANE WING CONNECTION
Filed March 31, 1927  2 Sheets-Sheet 2
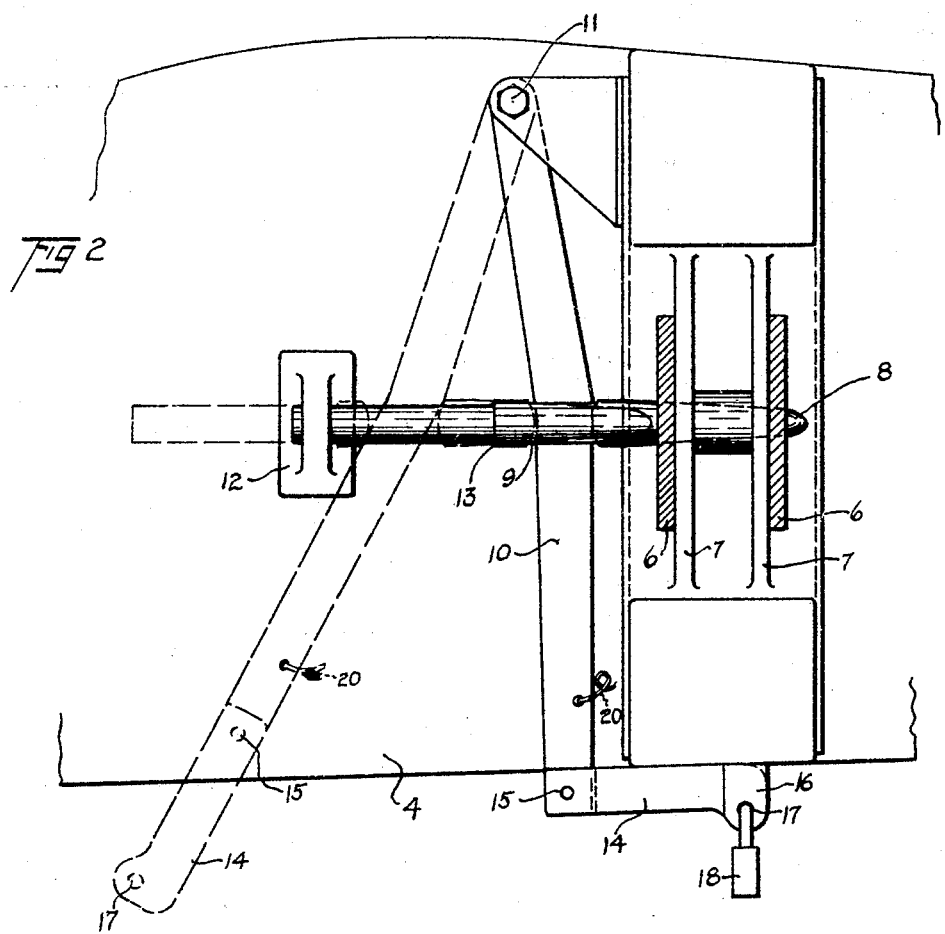
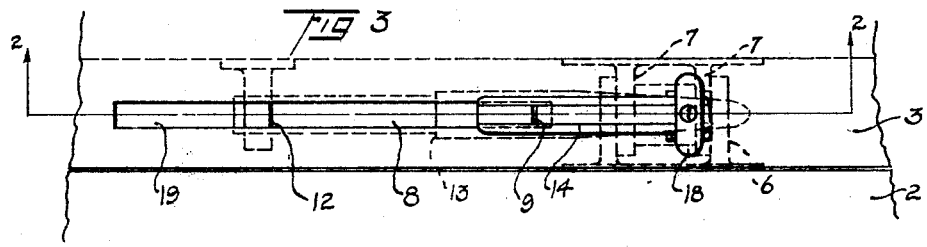
Inventor
Corydon M. Johnson
By Edward J. Noé Jr
Attorney Patented Mar. 11, 1930

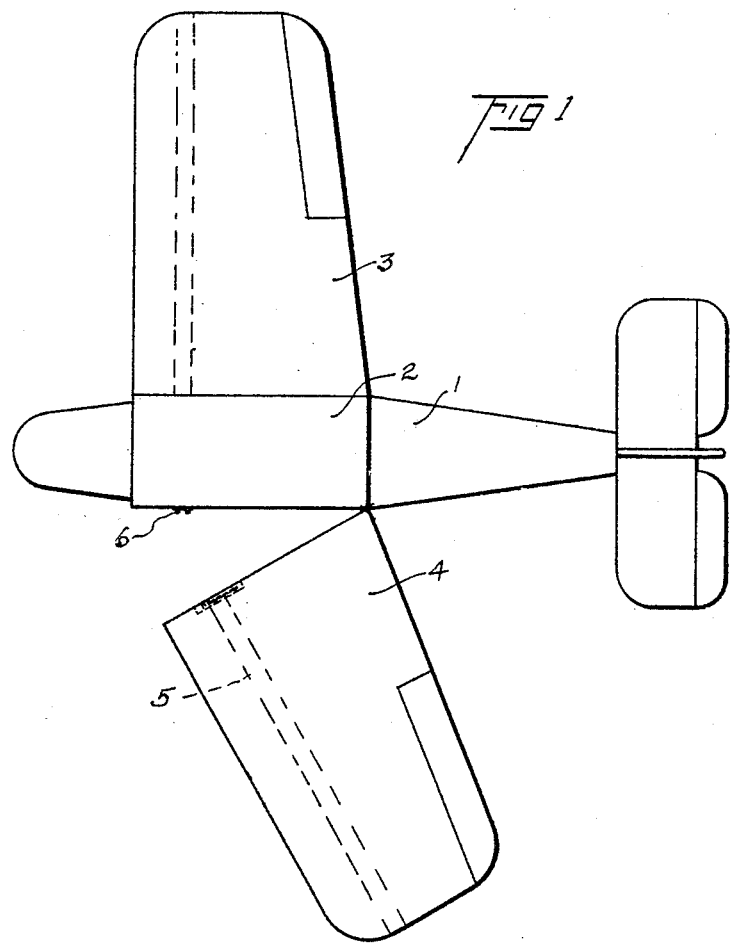

1,749,769

UNITED STATES PATENT OFFICE

CORYDON MILTON JOHNSON, OF FARMINGDALE, NEW YORK, ASSIGNOR TO FAIRCHILD AIRPLANE MANUFACTURING CORPORATION, OF NEW YORK, N. Y.

AIRPLANE-WING CONNECTION

Application filed March 31, 1927. Serial No. 179,931.

This invention relates to airplanes provided with folding wing sections, and the primary object of the invention is the provision of a manually operable lever engaging the connecting pin which attaches the interfitting connecting parts on the wing section and on the support.

In order to provide a quickly detachable connection and yet one which will be positively maintained and relied upon, provision is made whereby the manually operable lever which controls the attaching pin can be locked in position say against the under side of the plane, so that the lever will be maintained in its proper position and will thus insure the permanence of the connection until release thereof is desired.

In the preferred form of the invention the pin controlling lever is pivoted on an axis transverse to the line of flight so that the lever extends downwardly and operates between the wing section and the supporting section to which the latter is attached. The connecting pin is provided with a taper which snugly fits within the tapered holes in the connecting lugs on the wing section and on the supporting section. The pin controlling lever is thus mounted adjacent to the pin in such manner as to be instantly available and easily accessible. The handle portion of the lever is movable on the lever to locking position against the lower wing surface where it offers a minimum of resistance to the air.

The embodiment outlined above is illustrated in the accompanying drawings, in which Fig. 1 is a plan view of an airplane showing the right wing in its flying position and showing the left wing partially folded, Fig. 2 is a section on the line 2—2 of Fig. 3, looking at the inner end of the wing section, and Fig. 3 is a view looking upwardly at the detachable forward connection in its assembled position.

Referring more particularly to the drawings by reference numerals, the airplane fuselage 1 is equipped with a central supporting section 2, and the customary motor, propellers, etc., not shown. The right and left wing sections 3 and 4 are attached adjacent their rear portions to the central supporting section 2 in any suitable manner. At a point adjacent to the forward wing beam 5 of each wing section, a quickly detachable and easily operated attachment is provided. The central section 2 is equipped with laterally projecting lugs 6 which interfit with the two inwardly projecting lugs 7 provided on the inner end of each wing section. The lugs 6 and 7 form connections which are each provided with tapered holes to snugly receive the tapered pin 8 to maintain the connecting lugs attached together.

The tapered pin 8 is slotted at 9 and a control lever 10 pivoted on an axis 11 extending transversely of the airplane, extends thru the slot and is adapted to be moved in a longitudinal direction to cause the pin to be moved into or out of engagement with the lugs 6 and 7. The pin 8 at its rear end is guided in a guide lug 12 which is provided on the inner end of the wing section. A slight enlargement at 13 on the pin engages lug 12 to prevent the rounded front end of the pin from being moved entirely free of the rear lug 6. The lower end of the lever 10 is provided with a handle portion 14 which is pivoted at 15 to the main part of the lever 10. The handle portion 14 is of suitable size to be grasped by the hand when the handle 14 extends downwardly from the lever as shown in dotted lines in Fig. 2. In this position the handle 14 may be manually operated to cause the lever 10 to be moved to the position shown in dotted lines to thus cause the release of the pin 8 and the unfastening of the connecting lugs 6 and 7. The wing section may then be moved away from the supporting section 2 or may be pivoted about a suitable axis to permit the folding of the wing to a position back along the fuselage.

A small lug 16 extends downwardly from the wing section just below the attachment lugs 7. This lug 16 is provided with a small hole which engages with a small hole 17 provided in the handle 14, so that the handle 14 may be locked in the position shown in Fig. 2, in solid lines, by means of the padlock 18 which extends thru the hole 17 in the handle and also thru the hole of the lug 16. This padlock thus serves to maintain the handle in a horizontal position against the lower side of the plane and also to maintain the lever 10 and consequently the attachment pin 8 in position to prevent the releasing of the attachment lugs. The handle 14, when locked in a horizontal position, offers a minimum amount of wind resistance, and yet the arrangement shown permits the quick operation of the tapered pin while insuring the reliability and the positive connection of the wing section. The lever 10 operates back and forth in the slot 19 which is provided between the wing section 3 and the central fixed supporting surface 2. The lever 10 may also be provided with a spring 20 which is attached at its other end to a suitable point on the wing section so that the lever 10 is yieldingly maintained in position to keep the pin 8 in engagement with the lugs 6 and 7.

It will be apparent that various changes may be made without departing from the spirit or scope of my invention which has herein been set forth in its preferred form.

I claim:

1. In an airplane having a folding wing section, a support, a detachable connection for the inner end of the wing section comprising a pair of inter-fitting connections, one on the wing section and one on the support, a pin inter-connecting said connections, and a manually operated downwardly extending lever connected to said pin and located adjacent thereto, for quickly manually moving the pin to release the section, said lever having a handle portion movable thereon to a position flat against the lower wing surface.

2. In an airplane having a wing section adapted to be folded back along the fuselage, a supporting section, a detachable connection for the inner end of the wing section comprising a pair of inter-fitting lugs, one on the wing section and one on the supporting section, a tapered pin inter-connecting said lugs, guide means for said pin, and a manually operated downwardly extending lever engaging said pin and pivoted on one of said sections on a transverse axis, so as to extend down from the lower surface of the wing section, said lever having a handle portion movable thereon to a position against the lower wing surface.

3. In an airplane having a folding wing section, a support, a detachable connection for the inner end of the wing section comprising a pair of inter-fitting connections, one on the wing section and one on the support, a pin inter-connecting said connections, and a manually operated downwardly extending lever connected to said pin and located adjacent thereto, for quickly manually moving the pin to release the section, said lever having a handle portion movable thereon to a position flat against the lower wing surface, and a fastening means for fastening the handle portion in a substantially horizontal position and thereby preventing motion of said lever.

4. In an airplane having a wing section adapted to be folded along the fuselage, a support, a detachable connection for the inner end of the wing section comprising a pair of inter-fitting connecting parts, one on the wing section and one on the support, a longitudinally extending tapered pin interconnecting said parts, guide means on said wing section for said pin, a manually operated lever connected to said pin and pivoted on said wing section on a transverse axis, a handle projecting below the lower surface of the wing section movably attached to said lever, so as to be moved into a horizontal position against the wing, and a lock for engaging the end of the handle to fasten the handle in a horizontal position and fasten the lever in position to maintain the pin engaged.

5. In an airplane having folding wings, a supporting section with which said wings are detachably secured near their leading edges and hingedly secured near their trailing edges to render said wings foldable rearwardly about such hinges in a substantially horizontal plane, a pair of members arranged on the inner end of each wing near its leading edge and adapted to engage and fit within a pair of similar members arranged on said supporting section, and a single manually operable releasable means for each wing for securing said members against relative movement.

6. In an airplane, a center section, wings detachably secured thereto, the abutting edges of each wing lying flush with the corresponding edges of said center section, said wings being hingedly connected near their trailing edges and detachably connectible near their leading edges to said center section, a pair of members arranged on the inner end of each wing near its leading edge and adapted to engage and fit within a pair of similar members arranged on said center section, and a single manually operable releasable means for each wing, said means being adapted to pass through said members for securing them against relative movement.

In testimony whereof I have hereunto set my hand this 9th day of March, 1927.

CORYDON MILTON JOHNSON.